W. R. COLLINGS AND J. A. GANN.
METHOD OF MAKING MAGNESIUM SULFATE.
APPLICATION FILED FEB. 10, 1919.
1,356,907.
Patented Oct. 26, 1920.
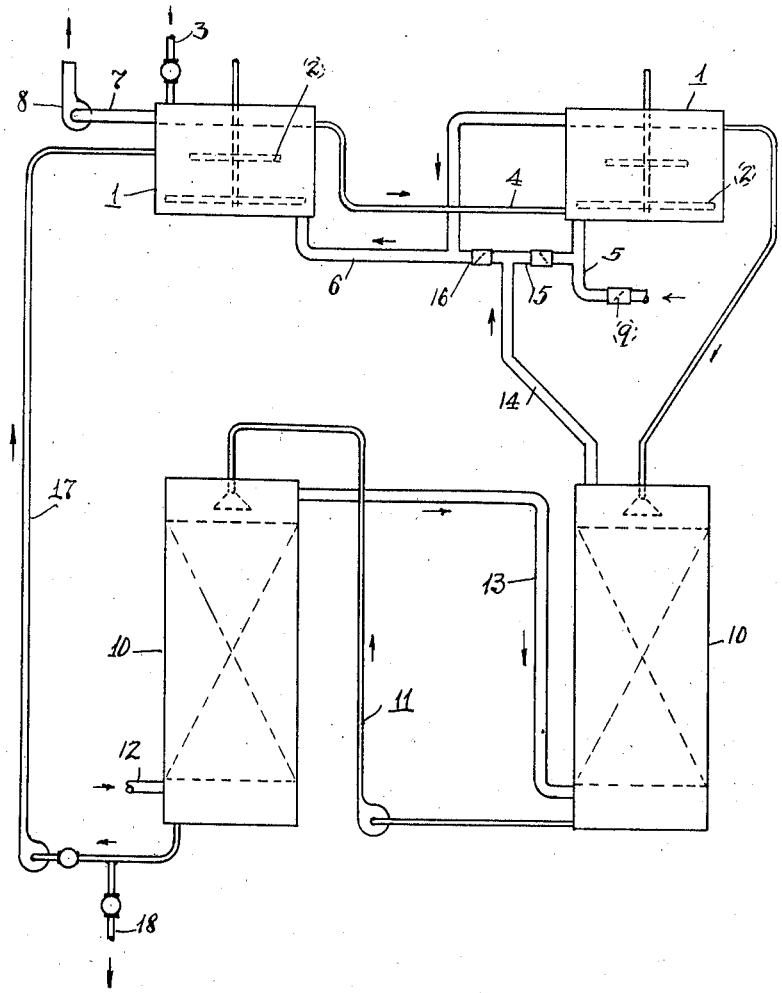
INVENTORS
William R. Collings and
John A. Gann
By Fay, Oberlin & Fay
ATTORNEYS.

UNITED STATES PATENT OFFICE.

WILLIAM R. COLLINGS AND JOHN A. GANN, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING MAGNESIUM SULFATE.

1,356,907.   Specification of Letters Patent.   Patented Oct. 26, 1920.

Application filed February 10, 1919. Serial No. 276,103.

*To all whom it may concern:*

Be it known that we, WILLIAM R. COLLINGS and JOHN A. GANN, citizens of the United States, and residents of Midland, county of Midland, State of Michigan, have jointly invented a new and useful Improvement in Methods of Making Magnesium Sulfate, of which the following is a specification, the principle of the invention being herein explained and the best mode in which we have contemplated applying that principle, so as to distinguish it from other inventions.

The object of the present invention is to provide a method for manufacturing magnesium sulfate in the form known as epsom salts, $MgSO_4,7H_2O$, directly from magnesium hydrate, $Mg(OH)_2$. A further object is to render the process continuous and more or less cyclic in its character, so that the cost of production may be reduced in this way as well as by the availability and cheapness of the materials required.

To the accomplishment of the foregoing and related ends, the invention, then, consists of the steps hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

The single figure there appearing is a diagrammatic representation of an apparatus adapted for the carrying out of our present improved method or process.

Such method or process is based on the discovery that magnesium bi-sulfite, $Mg(HSO_3)_2$, in solution may be readily oxidized by atmospheric air, at room temperature or slightly above, to form the sulfate with seven molecules of water of crystallization, known commercially as epsom salts, $MgSO_4,7H_2O$. Such bi-sulfite is readily prepared by treating magnesium hydrate with sulfur dioxid, or in other words with ordinary burner gases. This operation is preferably carried out in a series of tanks 1, 1, provided with stirring devices 2, 2, through which a mixture of such hydrate in water is passed in succession, being supplied to the first tank in the series through a suitable valve controlled inlet pipe 3, and flowing from the one tank to the other through a connecting pipe 4. The hydrate is preferably in flocculent form, since this permits its more uniform dissemination in the mixture, and correspondingly speeds the reaction. Simultaneously we pass through such tanks in the opposite direction a stream of burner gas, this being first admitted to the last tank in the series, having regard to the direction of flow of the hydrate mixture therethrough, by means of a duct 5 and the gases passing from such tank to the next through a connecting duct 6, the residual gases finally escaping through a duct 7. The gases are preferably drawn through the series of tanks in the fashion just described, by means of a suction fan 8 connected with such last mentioned duct, and, for a reason that will presently appear, a damper valve 9 is desirably provided in the inlet duct 5.

The reaction occurring in the tanks 1, 1 may be represented by the following equation, viz:—

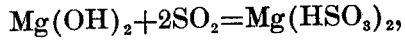

$$Mg(OH)_2 + 2SO_2 = Mg(HSO_3)_2,$$

it being understood that the rate of flow of the hydrate mixture through the tanks and the counter-flow of burner gases will be such as to insure the extraction of the sulfur dioxid from the latter, and the substantially complete conversion of the hydrate to the bi-sulfite. The resulting solution of the latter passes from the last of the series of tanks 1 to the first of a series of absorbing towers 10, 10, being sprayed over the filling in such tower, collected in the bottom thereof and elevated through a connecting pipe 11 to the top of the next tower over the filling in which it is similarly sprayed. Air enters the bottom of such last tower 10 in the series through an inlet duct 12, and after passing upwardly through the filling therein, is led in turn to the bottom of the first tower by a connecting duct 13, as shown in the drawing. After passing through such last mentioned tower, the air, which will contain a certain quantity of sulfur dioxid as a result of the reaction occurring in said towers, is led by means of a duct 14 to either duct 5 or duct 6 by means of branched valve controlled connections 15 and 16 respectively. By suitably adjusting the valves in these connections, in other words, the sulfur dioxid laden air from the towers may be added to the burner gases as the latter enter the first of the series of tanks 1, or may be added to the residual burner gases after the latter have passed through such first tank. The same suction fan 8 that draws the burner gases through the tanks, it will be seen, serves to also draw the air through the towers and through one or both of said tanks as the case may be, the proportion of air and burner gases utilized in the several tanks being regulated by means of the valves in ducts 5, 15 and 16.

The oxidizing action that takes place in the towers 10, 10 may be represented by the following equation, viz.—

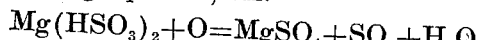

$$Mg(HSO_3)_2 + O = MgSO_4 + SO_2 + H_2O.$$

The magnesium sulfate that results from this reaction does not of course initially form a saturated solution. We accordingly prefer to conduct such solution back again, by means of a connecting pipe 17, to the first of the tanks 1, 1, where it is mixed with a fresh supply of magnesium hydrate. It serves merely as a vehicle for the latter, which, upon being converted into the bi-sulfite in such tanks, and then later into the desired sulfate in the towers, adds correspondingly to the concentration of the solution. When the latter becomes sufficiently concentrated, it may be withdrawn through a valve controlled branch 18 of said pipe 17, either continuously or intermittently, as found preferable in practice.

It will be understood that a larger number of mixing tanks 1, as well as a larger number of towers 10, may be employed as found desirable, having regard to the size of the operation, and the rate of flow of gas and liquid through said tanks and towers. The sulfur dioxid, freed by the reaction that occurs in the towers, is not wasted, but is conducted back to the first stage in the process, there to convert more hydrate into the bi-sulfite. Both this reaction and the reaction in the towers is a continuous and counter-flow operation, rendering the control extremely simple, so that a minimum of attention is required on the part of the operator in charge. The materials employed, viz., magnesium hydrate and sulfur dioxid, are relatively inexpensive and easily obtained.

Other modes of applying the principle of our invention may be employed instead of the one explained, change being made as regards the steps herein disclosed, provided those stated by any one of the following claims or their equivalents be employed, We therefore particularly point out and distinctly claim as our invention:—

1. The method of making magnesium sulfate, which consists in treating magnesium hydrate with sulfur dioxid, whereby the bisulfite is formed, and then oxidizing the latter to the sulfate.

2. The method of making magnesium sulfate, which consists in treating magnesium hydrate with sulfur dioxid, whereby the bisulfite is formed, and then oxidizing the latter to the sulfate with a current of air.

3. The method of making magnesium sulfate, which consists in treating magnesium hydrate with sulfur dioxid, whereby the bisulfite is formed, oxidizing the latter to the sulfate with a current of air, sulfur dioxid being simultaneously set free, and then treating a fresh quantity of the hydrate with such sulfur dioxid.

4. The method of making magnesium sulfate, which consists in treating a mixture of magnesium hydrate in water with sulfur dioxid, whereby a solution of the bisulfite is formed, oxidizing the latter to the sulfate with air, then admixing more hydrate with the resulting solution, and repeating the foregoing steps until sulfate solution of the desired degree of concentration is obtained.

5. The method of making magnesium sulfate, which consists in treating a mixture of magnesium hydrate in water with sulfur dioxid, whereby a solution of the bisulfite is formed, oxidizing the latter to the sulfate with air, sulfur dioxid being simultaneously set free, then admixing more hydrate with the resulting solution, and repeating the foregoing steps until sulfate solution of the desired degree of concentration is obtained, the sulfur dioxid freed in the second step being utilized in the first step.

6. In a method of making magnesium sulfate, the step which consists in oxidizing the bisulfite with air, substantially as described.

Signed by us this 5th day of February, 1919.

WILLIAM R. COLLINGS.
JOHN A. GANN.